(12) United States Patent
Kim et al.

(10) Patent No.: US 9,096,739 B2
(45) Date of Patent: Aug. 4, 2015

(54) CELLULOSE ACETATE FILM

(75) Inventors: Myoung Lae Kim, Seoul (KR); Jee Young Ahn, Seoul (KR); Hyuk Jun Kim, Daejeon (KR); Ki Yup Kim, Seoul (KR); Sung Ho Son, Daejeon (KR); Yong Gyun Cho, Daejeon (KR); Won Yeob Kim, Daejeon (KR); Jun Tae Choi, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 343 days.

(21) Appl. No.: 13/820,328

(22) PCT Filed: Aug. 29, 2011

(86) PCT No.: PCT/KR2011/006352
§ 371 (c)(1),
(2), (4) Date: Apr. 29, 2013

(87) PCT Pub. No.: WO2012/030117
PCT Pub. Date: Mar. 8, 2012

(65) Prior Publication Data
US 2015/0053113 A1    Feb. 26, 2015

(30) Foreign Application Priority Data
Sep. 1, 2010  (KR) .......................... 10-2010-0085261

(51) Int. Cl.
| | | |
|---|---|---|
| *C08G 18/38* | (2006.01) |
| *C08L 1/14* | (2006.01) |
| *C08K 5/33* | (2006.01) |
| *C08J 5/18* | (2006.01) |
| *C08K 5/45* | (2006.01) |
| *C08L 1/12* | (2006.01) |
| *G02B 1/04* | (2006.01) |
| *G02B 5/30* | (2006.01) |

(52) U.S. Cl.
CPC ... *C08K 5/33* (2013.01); *C08J 5/18* (2013.01); *C08K 5/45* (2013.01); *C08L 1/12* (2013.01); *G02B 1/04* (2013.01); *G02B 5/3083* (2013.01); *C08J 2301/12* (2013.01)

(58) Field of Classification Search
CPC .......... C08K 5/33; C08J 5/18; C08J 2301/12; C07C 251/48; C07C 249/12; C07C 251/50; C07D 213/64
USPC ...................................................... 524/35, 39
See application file for complete search history.

(56) References Cited

U.S. PATENT DOCUMENTS

| | | |
|---|---|---|
| 2007/0292635 A1 | 12/2007 | Nishiura et al. |
| 2010/0055356 A1 | 3/2010 | Takeda et al. |
| 2011/0108780 A1 | 5/2011 | Chung et al. |

FOREIGN PATENT DOCUMENTS

| | | | |
|---|---|---|---|
| GB | 1058813 | * | 2/1967 |
| JP | 2005154764 A | | 6/2005 |
| JP | 2007121996 A | | 5/2007 |
| KR | 1020100006837 A | | 1/2010 |

* cited by examiner

*Primary Examiner* — William Cheung
(74) *Attorney, Agent, or Firm* — The Webb Law Firm

(57) ABSTRACT

Provided is a cellulose acetate film used for optical compensation and, in particular, a cellulose acetate film having a low retardation value $R_{th}$ in the film thickness direction.

9 Claims, No Drawings

CELLULOSE ACETATE FILM

This application is a national stage application under 35 U.S.C. 371 of PCT Application No. PCT/KR2011/006352 filed Aug. 29, 2011, which claims benefit of Korea Application No. 10-2010-0085261 filed Sep. 1, 2010. The entire disclosure of which is hereby incorporated herein by reference.

TECHNICAL FIELD

The present invention relates to a cellulose acetate film used for optical compensation and, more particularly, to a cellulose acetate film with a low retardation value $R_{th}$ in the film thickness direction.

The present invention also relates to an optical compensation sheet, a polarizer and a liquid crystal display device, using the cellulose acetate film.

BACKGROUND ART

A cellulose acetate film has high strength and flame retardant properties ('flame resistance'), thus being used for various photographic or optical materials. Compared with other polymer films, the cellulose acetate film has relatively low optical anisotropy which exhibits low retardation, therefore, is used for a polarizer.

In recent years, a liquid crystal display device having high performance such as improvement in image quality is increasingly required. Accordingly, a cellulose acetate film used for a polarizer, which is a material also used in a liquid crystal display device, also needs characteristics satisfying the foregoing requirements. More particularly, in case of an in plain switching (IPS) mode liquid crystal display device, in order to overcome problems related to variation of colority and enhance a contrast ratio, there is a need to reduce optical anisotropy of the cellulose acetate film ($R_e$—retardation value in the film plane; $R_{th}$—retardation value in the film thickness direction). Accordingly, the development of cellulose acetate films capable of the foregoing is now being strongly demanded.

DISCLOSURE OF INVENTION

Technical Problem

The present invention is directed to providing a cellulose acetate film with a low retardation value in the film thickness direction, as an optical film. More particularly, the present invention provides an optical compensation film capable of being used for an IPS mode LCD device and enabling improvement in viewing angle characteristics of an IPS mode LCD panel.

The present invention also provides a retardation inhibitor to satisfy optical properties described above.

Further, the present invention provides an optical compensation sheet, a polarizer and a liquid crystal display device, which are fabricated using the foregoing cellulose acetate film.

Solution to Problem

According to the present invention, there is provided a cellulose acetate film with excellent optical properties, that is, a cellulose acetate film having excellent optical properties wherein a retardation value in the film plane ('in-plane retardation value') ranges from 0 to 10 nm and a retardation value in the film thickness direction ranges from −40 to 10 nm.

More particularly, the present invention provides a cellulose acetate film wherein $R_e(\lambda)$ and $R_{th}(\lambda)$ satisfy respectively the following equations (I) and (II):

$$0 \leq R_e(600) \leq 10 \quad (I)$$

$$-40 \leq R_{th}(600) \leq 10 \quad (II)$$

(wherein $R_e(\lambda)$ is a retardation value in the film plane (unit: nm) at a wavelength of $\lambda$ nm while $R_{th}(\lambda)$ is a retardation value in the film thickness direction (unit: nm) at a wavelength of $\lambda$ nm).

The film may be a cellulose acetate film with $R_e(\lambda)$ and $R_{th}(\lambda)$ satisfying the following equations (III) and (IV), respectively:

$$|R_e(450)-R_e(750)|/|R_e(550)| \leq 3 \quad (III)$$

$$|R_{th}(450)-R_{th}(750)|/|R_{th}(550)| \leq 3 \quad (IV)$$

(wherein $R_e(\lambda)$ is a retardation value in the film plane (unit: nm) at a wavelength of $\lambda$ nm while $R_{th}(\lambda)$ is a retardation value in the film thickness direction (unit: nm) at a wavelength of $\lambda$ nm).

If the above ranges are satisfied, double refraction (that is, 'birefringence') of the film shows reduced wavelength dependence, thus preventing coloring of a liquid crystal display ('LCD') device.

As a retardation additive satisfying the foregoing conditions, the present invention

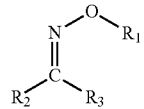

Formula 1

(wherein, in Formula 1, $R_1$, $R_2$ and $R_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20) heteroaryl containing at least one element selected from N, O and S;

wherein alkyl, aryl, cycloalkyl, alkenyl, aralkyl, heterocycloalkyl and heteroaryl described above may be further substituted with at least one selected from: (C1-C7)alkyl; halogen; nitro; cyano; hydroxyl; amino; (C6-C20)aryl; (C2-C7) alkenyl; (C3-C20)cycloalkyl; 5- to 7-membered heterocycloalkyl containing at least one element selected from N, O and S; or (C4-C20)heteroaryl containing at least one element selected from N, O and S; and wherein $R_2$ and $R_3$ may be linked together by (C2-C10) alkylene substituted or unsubstituted with (C1-C7)alkyl and/or (C6-C12)aryl, to form an alicyclic ring.

The alicyclic ring may include a spiro ring.

Hereinafter, technical configurations of the present invention will be described in detail.

First, with regard to a cellulose acetate film, the cellulose acetate film according to the present invention may have a density of 1.2 to 1.35, without being particularly limited thereto.

The retardation value in the film thickness direction of the cellulose acetate film may ranges from −40 to 10 nm. More preferably, the retardation value in the film thickness direction ranges from −10 to 5 nm.

Cellulose acetate is an ester of cellulose and acetic acid, wherein hydrogen atoms of the hydroxyl groups present at 2-, 3- and 6-positions of a glucose unit to form the cellulose are partially or entirely substituted by acetyl groups. The degree of substitution of cellulose acetate is not particularly limited, however, may be 2.7 or more and, more preferably, ranges from 2.7 to 3.0. The degree of substitution may be measured according to ASTM D-817-91.

The cellulose acetate of the present invention preferably has a weight average molecular weight of 200,000 to 350,000, although not limited thereto. And, the cellulose acetate preferably has a molecular weight distribution $M_w/M_n$, ($M_w$=weight average molecular weight, $M_n$=number average molecular weight) of 1.4 to 1.8, more preferably 1.5 to 1.7.

The cellulose acetate film may be prepared by a solvent casting process using a cellulose acetate dope solution. The solvent casting process includes casting a solution (dope) of cellulose acetate dissolved in a solvent on a support and then evaporating the solvent, to thereby form a film.

The cellulose acetate dope solution may preferably include cellulose acetate particles. Preferably, 90 wt % or more of the cellulose acetate particles have an average particle size of 0.5 to 5 mm. Also preferably, 50 wt % or more of the cellulose acetate particles have an average particle size of 1 to 4 mm.

Preferably, the cellulose acetate particles have a spherical shape if possible. And preferably, the cellulose acetate particles may be dried to have a moisture content of 2% or less, more preferably, 1% or less, before the preparation of the dope solution.

Next, additives included in the cellulose acetate film will be described.

The cellulose acetate solution (dope) used in the solvent casting process may further include a variety of additives depending upon uses thereof in individual preparation processes, for example: a plasticizer; a UV stabilizer (or absorber); a degradation inhibitor; fine particles; a releasing agent (or stripper); an infrared (IR) absorber; an optical anisotropy control agent, and so forth. Practical examples of such additives may include any one commonly used in the related art, without being particularly limited thereto. A content of the additive may be within the range in which physical properties of a film are not degraded. An addition time of the additive is determined based on the kinds of additives. At the final stage of the dope preparation, the additive may be added.

The plasticizer is used for improving a mechanical strength of the film and, using the plasticizer, a dry time of the film may be reduced. The plasticizer may include any one commonly used in the related art, without being particularly limited thereto, for example, carboxylic acid esters selected from phosphoric acid ester, phthalic acid ester or citric acid ester. Examples of the phosphoric acid ester may include triphenyl phosphate (TPP), biphenyldiphenyl phosphate, tricresyl phosphate (TCP), and so forth. Examples of the phthalic acid ester may include dimethyl phthalate (DMP), diethyl phthalate (DEP), dibutyl phthalate (DBP), dioctyl phthalate (DOP), diphenyl phthalate (DPP), diethylhexyl phthalate (DEHP), and so forth. Example of the citric acid ester may include o-acetyltriethyl citrate (OACTE), O-acetyltributyl citrate (OACTB), and so forth. Other carboxylic acid esters may include, for example, butyl oleate, methyl acetylricinoleate, dibutyl sebacate, and other trimellitic acid esters. Preferably, phthalic acid esters (DMP, DEP, DBP, DOP, DPP, DEHP) are used as the plasticizer. A content of the plasticizer may range from 2 to 20 parts by weight and, more preferably, 5 to 15 parts by weight, relative to 100 parts by weight of cellulose acetate.

The UV stabilizer may include hydroxybenzophenone compounds, benzotriazole compounds, salicylic acid ester compounds, cyanoacrylate compounds, and so forth. An amount of the UV stabilizer may range from 0.1 to 3 parts by weight and, more preferably, 0.5 to 2 parts by weight, relative to 100 parts by weight of cellulose acetate.

As the degradation inhibitor, for example, an antioxidant, a peroxide decomposer, a radical inhibitor, a metal inactivating agent, an oxygen scavenger, a light stabilizer (e.g. hindered amine), and so forth, may be used. A particularly preferable degradation inhibitor may include, for example, butylated hydroxytoluene (BHT) and tribenzylamine (TBA). An amount of the degradation inhibitor may range from 0.01 to 5 parts by weight and, more preferably, 0.1 to 1 part by weight relative to 100 parts by weight of cellulose acetate.

Fine particles are added to favorably maintain film curling inhibition, carrying effects, adhesion prevention on a roll, abrasion resistance, and so forth, and any one selected from inorganic compounds and organic compounds may be used. For example, the inorganic compounds may include silicon containing compounds, silicon dioxide, titanium oxide, zinc oxide, aluminum oxide, barium oxide, zirconium oxide, strontium oxide, antimony oxide, tin oxide, tin-antimony oxide, calcium carbonate, talc, clay, calcined kaolin, calcined calcium silicate, calcium silicate hydrate, aluminum silicate, magnesium silicate, calcium phosphate, and so forth. More preferably, silicon-containing inorganic compounds or zirconium oxide are used. The fine particles may have an average primary particle diameter of 80 nm or less, preferably 5 to 80 nm, more preferably 5 to 60 nm and, particularly preferably, 8 to 50 nm. When the average primary particle diameter exceeds 80 nm, surface flatness of the film may be deteriorated.

The following description will be given of a retardation inhibitor used in the present invention.

The retardation inhibitor is used to decrease the retardation value $R_{th}$ in the film thickness direction of the film, and may include a compound represented by Formula 1.

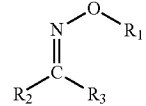

Formula 1

(wherein, in Formula 1, $R_1$, $R_2$ and $R_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20)heteroaryl containing at least one element selected from N, O and S;

wherein alkyl, aryl, cycloalkyl, alkenyl, aralkyl, heterocycloalkyl and heteroaryl described above may be further substituted with at least one selected from: (C1-C7)alkyl; halogen; nitro; cyano; hydroxyl; amino; (C6-C20)aryl; (C2-C7)alkenyl; (C3-C20)cycloalkyl; 5- to 7-membered heterocycloalkyl containing at least one element selected from N, O and S; or (C4-C20)heteroaryl containing at least one element selected from N, O and S; and wherein $R_2$ and $R_3$ may be linked together by (C2-C10)alkylene substituted or unsubstituted with (C1-C7)alkyl and/or (C6-C12)aryl, to form an alicyclic ring).

The compound represented by Formula 1 may be prepared by reacting a ketone or aldehyde compound with a compound such as (C1-C10)alkoxyamine (C6-C20)aryloxyamine or hydroxylamine hydrochloride, etc., in the presence of an organic base or inorganic base. In this regard, the organic base or inorganic base may be an organic base such as triethylamine, pyridine or N,N-diisopropylethylamine, or an inorganic base such as NaOH, KOH, NaHCO$_3$, Na$_2$CO$_3$, etc.

Reaction Scheme I

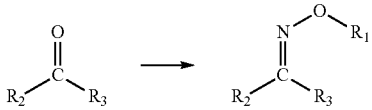

In the present invention, 'alkyl', 'alkoxy' and other substituents containing 'alkyl' portions may include both linear and branched structures.

'Aryl' described herein is an organic radical derived from aromatic hydrocarbon by the removal of one hydrogen, and each ring may include single or fused ring systems containing 4 to 7, preferably, 5 to 6 ring atoms. Practical examples thereof may include phenyl, naphthyl, biphenyl, tolyl, and so forth, without being particularly limited thereto.

'Heteroaryl' described herein means an aryl group including 1 to 3 heteroatoms selected from N, O and S as aromatic ring framework atoms, while the remaining aromatic ring framework atoms are carbon. The heteroaryl group may include divalence aryl group wherein the heteroatom in the ring is oxidized or altered into a quaternary structure, for example, to form N-oxide or a quaternary salt. Practical examples thereof may include, furyl, thiophenyl, pyrrolyl, piranyl, imidazolyl, pirazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and so forth, without being particularly limited thereto.

In Formula 1, R$_1$ is hydrogen or (C1-C10)alkyl, R$_2$ and R$_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20)heteroaryl containing at least one element selected from N, O and S.

Also, alkyl, aryl, cycloalkyl, alkenyl, aralkyl, heterocycloalkyl and heteroaryl described above may be further substituted with at least one selected from: (C1-C7)alkyl; halogen; nitro; cyano; hydroxyl; amino; (C6-C20)aryl; (C2-C7)alkenyl; (C3-C20)cycloalkyl; 5- to 7-membered heterocycloalkyl containing at least one element selected from N, O and S; or (C4-C20)heteroaryl containing at least one element selected from N, O and S.

In addition, R$_2$ and R$_3$ may be linked together by (C2-C10) alkylene substituted or unsubstituted with (C1-C7)alkyl and/or (C6-C12)aryl, to form an alicyclic ring.

More particularly, R$_1$ may be selected from hydrogen, methyl, ethyl, n-propyl, i-propyl, n-butyl, i-butyl, t-butyl, n-pentyl, i-pentyl and n-hexyl;

R$_2$ and R$_3$ are each independently selected from hydrogen, methyl, ethyl, n-propyl, i-

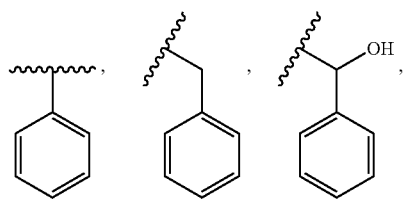

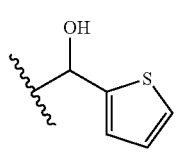

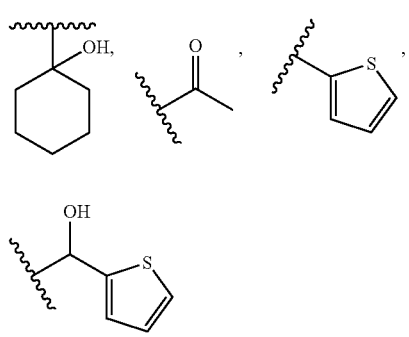

or, otherwise, may be linked together by (C2-C10)alkylene substituted or unsubstituted with (C1-C7)alkyl or (C6-C12) aryl to thus form an alicyclic ring. Herein, the alicyclic ring may include a spiro ring.

More particularly, the compound represented by Formula 1 may be exemplified by the following compounds, without being particularly limited thereto.

Formula 2

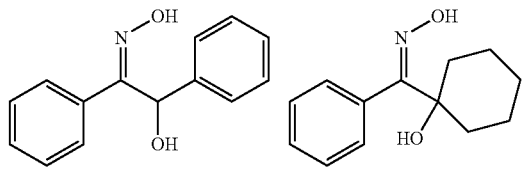

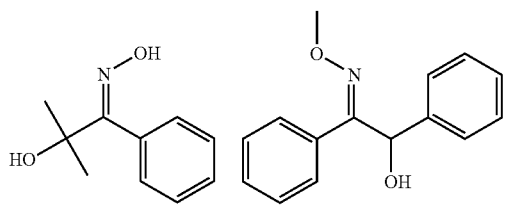

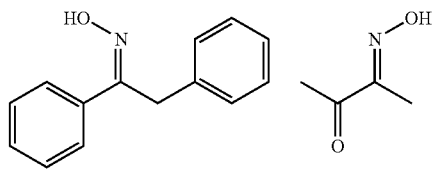

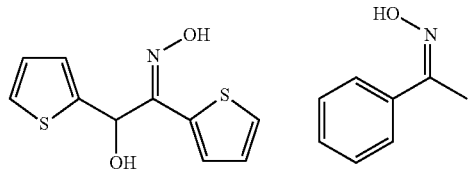

-continued

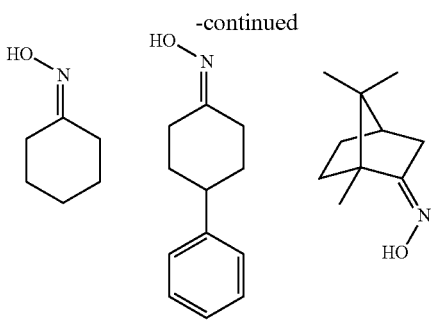

Other than the foregoing, an optical anisotropy control agent, a wavelength dispersion control agent, etc., may be further added if necessary. Such additives may include any one commonly used in the related art, without being particularly limited thereto.

Following this, a method for preparation of a cellulose acetate film according to the present invention will be described detail.

According to the present invention, in order to prepare the cellulose acetate film, a cellulose acetate composition, or a dope solution, is prepared as follows.

The cellulose acetate composition may include 1 to 20 parts by weight of a retardation inhibitor represented by Formula 1, relative to 100 parts by weight of cellulose acetate.

Formula 1

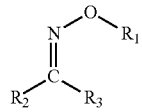

(wherein, in Formula 1, $R_1$, $R_2$ and $R_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20) heteroaryl containing at least one element selected from N, O and S;

wherein alkyl, aryl, cycloalkyl, alkenyl, aralkyl, heterocycloalkyl and heteroaryl described above may be further substituted with at least one selected from: (C1-C7)alkyl; halogen; nitro; cyano; hydroxyl; amino; (C6-C20)aryl; (C2-C7)alkenyl; (C3-C20)cycloalkyl; 5- to 7-membered heterocycloalkyl containing at least one element selected from N, O and S; or (C4-C20)heteroaryl containing at least one element selected from N, O and S; and wherein $R_2$ and $R_3$ may be linked together by (C2-C10) alkylene substituted or unsubstituted with (C1-C7)alkyl and/or (C6-C12)aryl, to form an alicyclic ring).

A solid content of the dope used in the present invention may range from 15 to 25 wt %, more preferably, 16 to 23 wt %. If the solid content of the dope is less than 15 wt %, fluidity is too high, thus causing difficulties in the formation of a film. When the solid content exceeds 25 wt %, dissolution may not be completely conducted.

According to the present invention, the content of cellulose acetate may be 70 wt % or more, preferably, 70 to 90 wt % and, more preferably, 80 to 85 wt % of the total solid contents. In addition, the cellulose acetate may be a mixture of at least two different kinds of cellulose acetates in terms of a degree of substitution, a degree of polymerization or a molecular weight distribution.

The retardation inhibitor may be used in an amount of 1 to 20 parts by weight, relative to 100 parts by weight of cellulose acetate. When used in the foregoing range, a desired (optical) phase difference range may be achieved. If using less than 1 part by weight of the additive, effects of reducing retardation may be deteriorated. On the other hand, if using more than 20 parts by weight of the additive, problems such as cost increase and bleeding (bleed-out) may occur.

In case that the film is prepared by solvent casting, a solvent used for preparation of a cellulose acetate composition (dope) is preferably an organic solvent. The organic solvent may be a halogenated hydrocarbon. Such halogenated hydrocarbon may include, for example, chlorinated hydrocarbon, methylene chloride and chloroform, and, among these, methylene chloride is most preferably used.

If necessary, organic solvents other than halogenated hydrocarbons may also be used as a mixture thereof. Such organic solvents (other than halogenated hydrocarbons) may include, for example, ester, ketone, ether, alcohol and hydrocarbons. Examples of the ester may include methyl formate, ethyl formate, propyl formate, pentyl formate, methyl acetate, ethyl acetate, pentyl acetate, and so forth. Examples of the ketone may include acetone, methylethylketone, diethylketone, diisobutylketone, cyclopentanone, cyclohexanone, methylcyclohexanone, and so forth. Examples of the ether may include diisopropylether, dimethoxymethane, diemethoxyethane, 1,4-dioxane, 1,3-dioxolane, tetrahydrofurane, anisole, penetol, and so forth. Examples of the alcohol may include methanol, ethanol, 1-propanol, 2-propanol, 1-butanol, 2-butanol, t-butanol, 1-pentanol, 2-methyl-2-butanol, cyclohexanol, 2-fluoroethanol, 2,2,2-trifluoroethanol, 2,2,3,3-tetrafluoro-1-propanol, and so forth.

More preferably, methylene chloride may be used as a main solvent and while using alcohol as a cosolvent. More particularly, methylene chloride and alcohol may be mixed and used in a ratio by weight of 80:20 to 95:5.

The cellulose acetate composition may be prepared by dissolution at room temperature, high temperature or low temperature.

Preferably, the cellulose acetate composition may have a viscosity of 1 to 400 Pa·s, and more preferably, 10 to 200 Pa·s at 40° C.

The cellulose acetate film may be prepared by a solvent casting process commonly used in the related art. More particularly, the dope (cellulose acetate composition) prepared as described above may be temporarily stored in a storage tank and undergo defoaming to remove foam in the dope. The defoamed dope flows out of a dope outlet, and passes through a pressure type metering gear pump that feeds the dope at high precision, in a predetermined amount depending upon revolutions of the pump, to a pressure type die. Then, the dope is uniformly casted on a metal support under endless driving through a spinneret (slit) of the pressure type die, to peel the still wet dope film (or referred to as 'web') from the support, at a releasing point on which the metal substrate reaches after almost taking a turn. While fitting both ends of the web into a clip to keep a (predetermined) width thereof, the web is fed to a tenter to dry the same, followed by passing through a roller of a dryer to dry the web and winding the dried web around a winder up to a predetermined length.

A space temperature while applying the solution may range from −50 to 50° C., more preferably, −30 to 40° C. and, most preferably, −20 to 30° C. The cellulose acetate solution applied at a low space temperature is immediately cooled on the support, which in turn improves gel strength, thereby producing a film that contains the organic solvent remaining in large quantities. As a result, the film may be peeled from the support in a short time without evaporating the organic solvent from the cellulose acetate. A gas generally used for cooling the space may be air, nitrogen, argon or helium. A relative humidity may range from 0 to 70%, more preferably. 0 to 50%.

The support (a casting part) coated with the cellulose acetate solution may have a temperature of −50 to 130° C., more preferably, −30 to 25° C. and, most preferably, −20 to 15° C. In order to cool the casting part, the gas cooled by the casting part may be introduced. By arranging the cooling device on the casting part, the space may be cooled. During cooling, it is important to prevent water from contacting the casting part. For gas cooling, the gas may be dried beforehand.

If necessary, the cellulose acetate film may be subjected to surface treatment. The surface treatment is generally performed to improve adhesiveness of the cellulose acetate film. The surface treatment may be executed by glow discharging, UV irradiation, corona discharge, flame treatment, saponification, etc.

The cellulose acetate film may be stretched to control the degree of retardation. Preferably, the degree of stretching is −10 to 100%, more preferably, −10 to 50% and, most preferably, −5 to 30%.

A thickness of the cellulose acetate film may range from 20 to 140 μm, more preferably, 40 to 100 μm.

The cellulose acetate film according to the present invention may be used for an optical filter for stereophonic image, a polarizer, an optical compensation sheet and/or a liquid crystal display device. The cellulose acetate film may be formed into a laminate of one or two or more sheets and used.

Advantageous Effects of Invention

As set forth above, the cellulose acetate film of the present invention exhibits a low retardation value in the film thickness direction.

The cellulose acetate film of the present invention may have low phase difference, thus improving a viewing angle of an IPS mode LCD panel, a contrast ratio, a color shift phenomenon, and so forth.

MODE FOR THE INVENTION

Hereinafter, preferred embodiments of the present invention will be described in detail by the following examples, however, the scope of the present invention is not particularly limited to such examples.

Physical properties of the film were measured by the following measurement methods.

1) Optical Anisotropy

Light at a wavelength of 450, 550, 600, and 750 nm was projected in a normal direction to a film ('film normal direction'), respectively, using a birefringence measurement device (Axoscan, a registered trademark, manufactured by Axometrics), to measure $R_e$. Also, $R_{th}$ was measured by projecting light at a wavelength of 450, 550, 600, and 750 nm, respectively on a slow axis in the $R_e$ plane as a slanted axis (determined by Axoscan), in an inclined direction at an angle of 40° to the film normal direction. Therefore, Retardation values were measured.

EXAMPLE 1

Preparation of Cellulose Acetate Composition (Dope)

The following compositions were placed in an agitator and dissolved at 30° C.

In the following compositions, the UV stabilizer was 2-(2H-benzotriazol-2-yl)-6-(1-methyl-1-phenylethyl)-4-(1,1,3,3-tetramethylbutyl)phenol.

| | |
|---|---|
| Cellulose acetate powder with a degree of substitution of 2.87 | 100 parts by weight |
| α-Benzoin oxime | 10 parts by weight |
| UV stabilizer | 2 parts by weight |
| Silicon dioxide, average particle diameter of 16 nm | 0.5 parts by weight |
| Methylene chloride | 440 parts by weight |
| Methanol | 50 parts by weight |

The obtained dope was heated to 30° C., transferred using a gear pump, filtered through a filter paper with an absolute filtering accuracy of 0.01 mm, and then, passed through a cartridge filtering device with an absolute filtering accuracy of 5 μm (to filter the dope).

Preparation of Cellulose Acetate Film

The dope obtained after the filtering process, was casted on a minor-surfaced stainless steel support through a casting die and then peeled off. An amount of the solvent residue during peeling was controlled to 25 wt. %. After connecting to a tenter, the film was stretched by 105% in the width direction ('%' in percentage by length). After passing through the tenter, 150 mm of both right and left ends of the film were cut off. The cut film passed through a dryer to be dried and 30 mm of both ends of the film output from the dryer were cut off. The both treated ends were then subjected to a knurling process at a width of 10 mm and a height of 68 μm and winding in a roll shape. The resultant sample has a thickness of 60 μm. Retardation value $R_{th}$ in the cellulose acetate film thickness direction was measured as described above.

EXAMPLES 2 TO 5

Preparation of Cellulose Acetate Film

Except that, among the compositions described in Example 1, α-benzoin oxime was replaced by each of the retardation inhibitors listed in TABLE 1 below to be added, the same procedures were implemented to prepare a (cellulose acetate) film. In this regard, the following compounds listed in TABLE 1 were introduced in different amounts to 100 parts by weight of the cellulose acetate powder, respectively, into a mixing tank, followed by heating and agitation. As a result, cellulose acetate compositions (dope) were produced.

TABLE 1

| | Kinds of additives | Content (parts by weight) |
|---|---|---|
| Example 1 | α-Benzoin oxime | 10 |
| Example 2 | (1-hydroxycyclohexyl)(phenyl)methanone oxime | 10 |
| Example 3 | 2-hydroxy-2-methyl-1-phenylpropan-1-one oxime | 10 |
| Example 4 | 3-(hydroxyimino)butan-2-one | 10 |
| Example 5 | 1,2-diphenylethanone oxime | 10 |

COMPARATIVE EXAMPLE 1

Preparation of Cellulose Acetate Composition (Dope)

The following compositions were placed in an agitator and dissolved at 30° C.

In the following compositions, the UV stabilizer was 2-(2H-benzotriazol-2-yl)-6-(1-methyl-1-phenylethyl)-4-(1,1,3,3-tetramethylbutyl)phenol.

| | |
|---|---|
| Cellulose acetate powder with a degree of substitution of 2.87 | 100 parts by weight |
| Triphenyl phosphate | 12 parts by weight |
| UV stabilizer | 2 parts by weight |
| Silicon dioxide, average particle diameter of 16 nm | 0.5 parts by weight |
| Methylene chloride | 440 parts by weight |
| Methanol | 50 parts by weight |

The obtained dope was heated to 30° C., transferred using a gear pump, filtered through a filter paper with an absolute filtering accuracy of 0.01 mm, and then, passed through a cartridge filtering device with an absolute filtering accuracy of 5 μm (to filter the dope).

Preparation of Cellulose Acetate Film

The dope obtained after the filtering process, was casted on a minor-surfaced stainless steel support through a casting die and peeled off. An amount of the solvent residue during peeling was controlled to 25 wt %. After connecting to a tenter, the film was stretched by 105% in the width direction ('%' in percentage by length). After passing through the tenter, 150 mm of both right and left ends of the film were cut off. The cut film passed through a dryer to be dried and 30 mm of both ends of the film output from the dryer were cut off. The both treated ends were then subjected to a knurling process at a width of 10 mm and a height of 68 μm and winding in a roll shape. The resultant sample has a thickness of 60 μm. Retardation value $R_{th}$ in the cellulose acetate film thickness direction was measured as described above.

Using the dope prepared above, a film was prepared according to the same procedures as described in the foregoing example, and results thereof are shown in TABLE 2 below.

TABLE 2

| | $R_e$ | | | | $R_{th}$ | | | |
|---|---|---|---|---|---|---|---|---|
| | 450 nm | 550 nm | 600 nm | 750 nm | 450 nm | 550 nm | 600 nm | 750 nm |
| Comparative Example 1 | 0.2 | 0.1 | 0.1 | 0.3 | 22 | 30 | 32 | 37 |
| Example 1 | 0.8 | 0.6 | 0.6 | 0.5 | −28 | −19 | −16 | −10 |
| Example 2 | 0.5 | 0.4 | 0.4 | 0.3 | −41 | −31 | −28 | −22 |
| Example 3 | 0.4 | 0.3 | 0.3 | 0.3 | −37 | −27 | −24 | −18 |
| Example 4 | 1.0 | 0.8 | 0.7 | 0.6 | −23 | −12 | −8.8 | −2.3 |
| Example 5 | 0.5 | 0.3 | 0.3 | 0.2 | −8.0 | −4.0 | −1.3 | 3.8 |

As shown in TABLE 2, the films of the present invention to which optical anisotropy control agents were added exhibited low $R_{th}$ values.

INDUSTRIAL APPLICABILITY

As set forth above, the cellulose acetate film of the present invention exhibits a low retardation value in the film thickness direction.

The cellulose acetate film of the present invention may have low phase difference, thus improving a viewing angle of an IPS mode LCD panel, a contrast ratio, a color shift phenomenon, and so forth.

The invention claimed is:

1. A cellulose acetate film, comprising at least one retardation inhibitor selected from compounds represented by Formula 1:

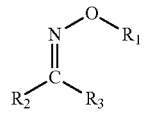

Formula 1

(wherein, in Formula 1, $R_1$, $R_2$ and $R_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20)heteroaryl containing at least one element selected from N, O and S;

wherein alkyl, aryl, cycloalkyl, alkenyl, aralkyl, heterocycloalkyl and heteroaryl described above may be further substituted with at least one selected from: (C1-C7)alkyl; halogen; nitro; cyano; hydroxyl; amino; (C6-C20)aryl; (C2-C7)alkenyl; (C3-C20)cycloalkyl; 5- to 7-membered heterocycloalkyl containing at least one element selected from N, O and S; or (C4-C20)heteroaryl containing at least one element selected from N, O and S; and wherein $R_2$ and $R_3$ may be linked together by (C2-C10)alkylene substituted or unsubstituted with (C1-C7)alkyl and/or (C6-C12)aryl, to form an alicyclic ring).

2. The cellulose acetate film of claim 1, wherein $R_1$ is selected from hydrogen, methyl, ethyl, n-propyl, i-propyl, n-butyl, i-butyl, t-butyl, n-pentyl, i-pentyl and n-hexyl; and $R_2$ and $R_3$ are each independently selected from hydrogen, methyl, ethyl, n-propyl, i-propyl, n-butyl, i-butyl, t-butyl, n-pentyl, i-pentyl,

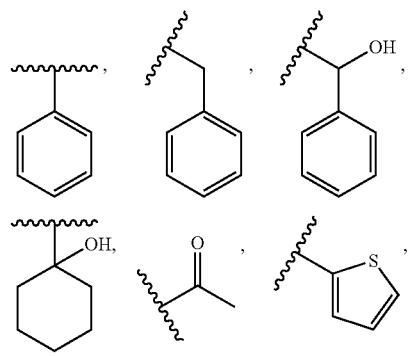

-continued

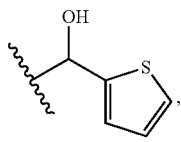

or, otherwise, may be linked together by (C2-C10)alkylene substituted or unsubstituted with (C1-C7)alkyl or (C6-C12)aryl to thus form an alicyclic ring, and wherein the alicyclic ring includes a spiro ring.

3. The cellulose acetate film of claim 1, wherein the compound represented by Formula 1 is selected from the following compounds represented by Formula 2:

Formula 2

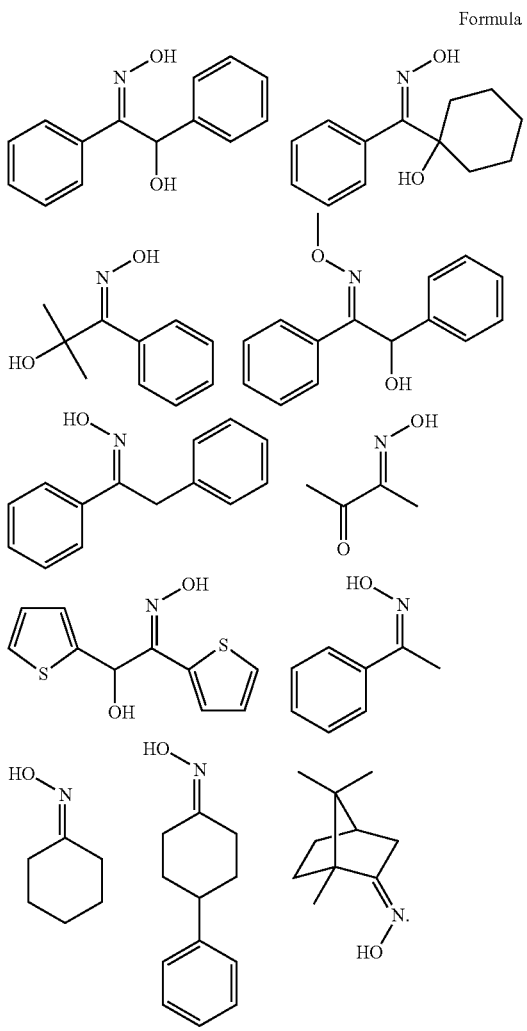

4. The cellulose acetate film of claim 1, wherein $R_e(\lambda)$ and $R_{th}(\lambda)$ of the film satisfy respectively the following equations (I) and (II):

$$0 \leq R_e(600) \leq 10 \quad \text{(I)}$$

$$-40 \leq R_{th}(600) \leq 10 \quad \text{(II)}$$

(wherein $R_e(\lambda)$ is a retardation value (unit: nm) in the film plane at a wavelength of $\lambda$nm while $R_{th}(\lambda)$ is a retardation value (unit: nm) in the film thickness direction at a wavelength of $\lambda$nm).

5. The cellulose acetate film of claim 1, wherein $R_e(\lambda)$ and $R_{th}(\lambda)$ of the film satisfy respectively the following equations (III) and (IV):

$$|R_e(450)-R_e(750)|/|R_e(550)| \leq 3 \quad \text{(III)}$$

$$|R_{th}(450)-R_{th}(750)|/|R_{th}(550)| \leq 3 \quad \text{(IV)}$$

(wherein $R_e(\lambda)$ is a retardation value (unit: nm) in the film plane at a wavelength of $\lambda$nm while $R_{th}(\lambda)$ is a retardation value (unit: nm) in the film thickness direction at a wavelength of $\lambda$nm).

6. A cellulose acetate composition, comprising 1 to 20 parts by weight of at least one retardation inhibitor selected from compounds represented by Formula 1, relative to 100 parts by weight of cellulose acetate:

Formula 1

(wherein, in Formula 1, $R_1$, $R_2$ and $R_3$ are each independently selected from: hydrogen; (C1-C10)alkyl; (C6-C20)aryl; (C3-C20)cycloalkyl; (C2-C7)alkenyl; (C6-C20)ar(C1-C20)alkyl; 5- to 7-membered heterocycloalkyl containing at least one element selected from N, O and S; and (C4-C20)heteroaryl containing at least one element selected from N, O and S;

wherein alkyl, aryl, cycloalkyl, alkenyl, aralkyl, heterocycloalkyl and heteroaryl described above may be further substituted with at least one selected from: (C1-C7) alkyl; halogen; nitro; cyano; hydroxyl; amino; (C6-C20) aryl; (C2-C7)alkenyl; (C3-C20)cycloalkyl; 5- to 7-membered heterocycloalkyl containing at least one element selected from N, O and S; or (C4-C20)heteroaryl containing at least one element selected from N, O and S; and wherein $R_2$ and $R_3$ may be linked together by (C2-C10) alkylene substituted or unsubstituted with (C1-C7)alkyl and/or (C6-C12)aryl, to form an alicyclic ring).

7. The cellulose acetate composition of claim 6, wherein at least one or two or more of the additives selected from a UV stabilizer, fine particles, a plasticizer, a degradation inhibitor, a releasing agent, an IR absorber and an optical anisotropy control agent, are further added to the composition.

8. A cellulose acetate film prepared from the cellulose acetate composition of claim 6.

9. The cellulose acetate film of claim 1, wherein the cellulose acetate film is used for an optical compensation sheet, an optical filter for stereophonic image, a polarizer, or a liquid crystal display device.

* * * * *